H. P. HARMON.
REGISTERING DEVICE FOR TYPE WRITERS.
APPLICATION FILED MAY 4, 1910.
996,409.
Patented June 27, 1911.
2 SHEETS—SHEET 1.
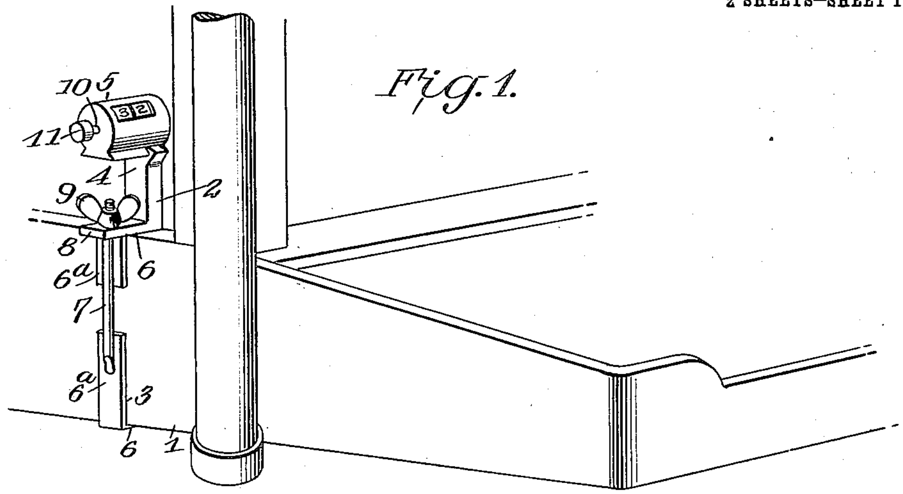
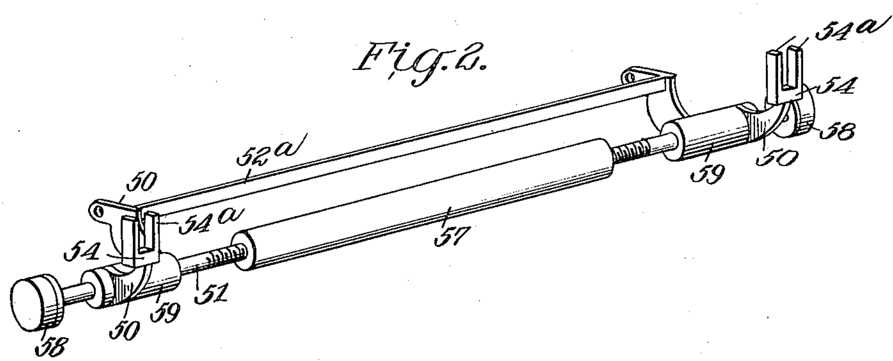
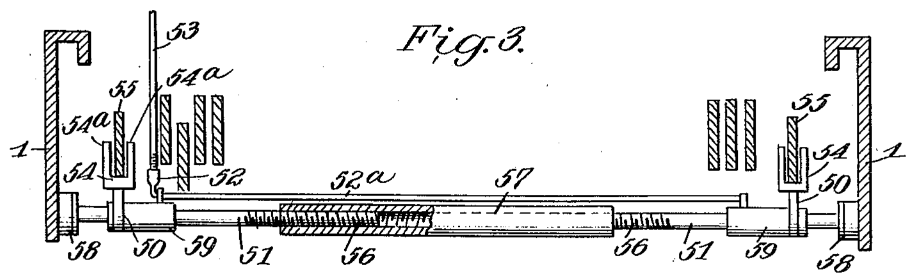
WITNESSES:
Samuel E. Wade.
C. E. Trainor
INVENTOR
HUBERT P. HARMON
BY Munn & Co.
ATTORNEYS H. P. HARMON.
REGISTERING DEVICE FOR TYPE WRITERS.
APPLICATION FILED MAY 4, 1910.
996,409. Patented June 27, 1911.
2 SHEETS—SHEET 2.
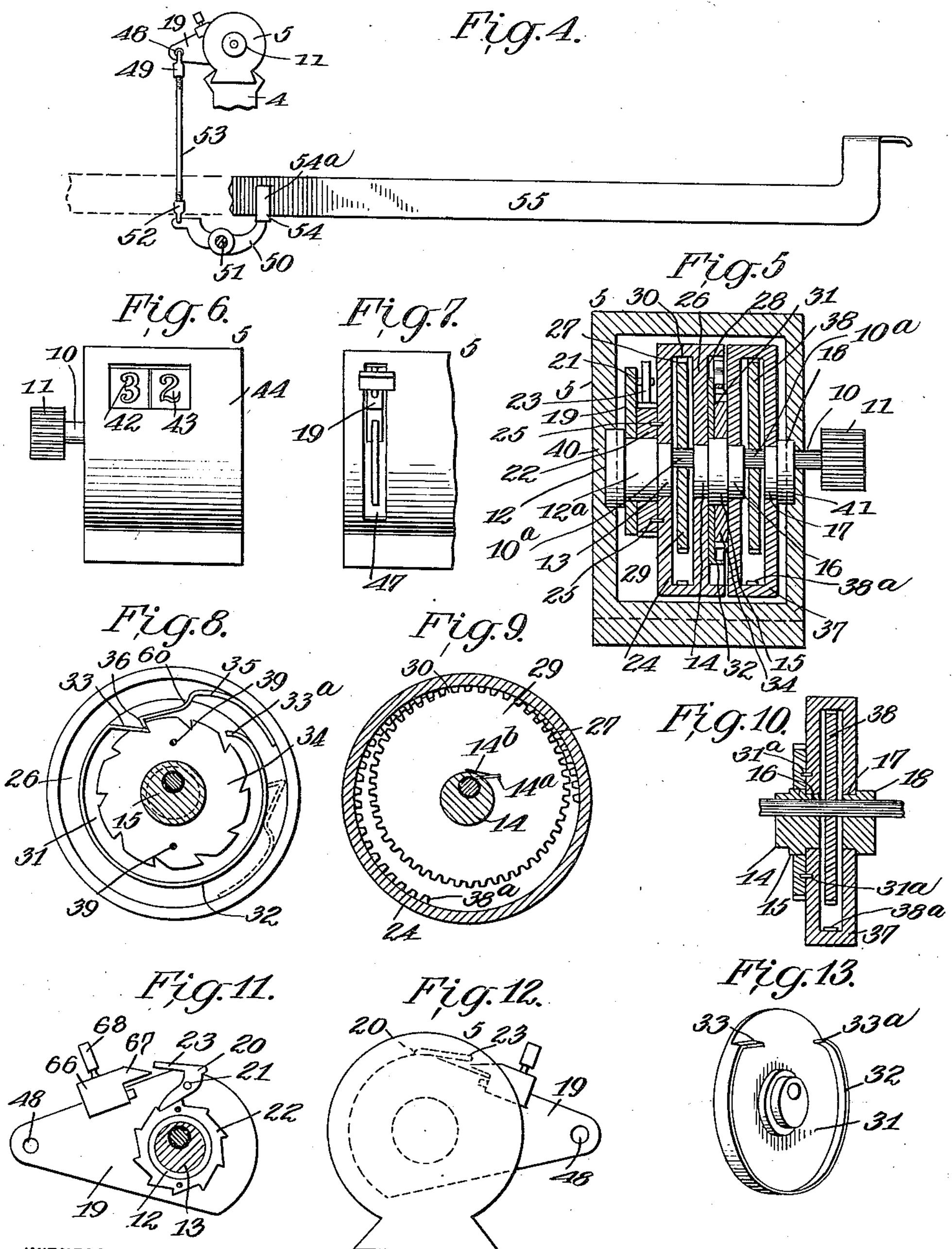
WITNESSES:
Samuel E. Wade.
C. E. Trainor
INVENTOR
HUBERT P. HARMON
BY Munn & Co.
ATTORNEYS

UNITED STATES PATENT OFFICE.

HUBERT P. HARMON, OF KALISPELL, MONTANA.

REGISTERING DEVICE FOR TYPE-WRITERS.

996,409. Specification of Letters Patent. Patented June 27, 1911.

Application filed May 4, 1910. Serial No. 559,297.

*To all whom it may concern:*

Be it known that I, HUBERT P. HARMON, a citizen of the United States, and a resident of Kalispell, in the county of Flathead and State of Montana, have made certain new and useful Improvements in Registering Devices for Type-Writers, of which the following is a specification.

My invention is an improvement in registering devices for typewriters, and consists in certain novel constructions, and combinations of parts, hereinafter described and claimed.

The object of the invention is to provide a simple compact and accurate registering device for attachment to any approved form of typewriter, which will correctly register the number of words written, and which may be easily attached and detached.

Referring to the drawings forming a part hereof, Figure 1 is a perspective view of the attachment in place on a typewriter, Fig. 2 is a similar view of the operating connection of the attachment and the typewriter, Fig. 3 is a partial transverse section of the typewriter base with the attachment in place, part of the attachment being broken away, Fig. 4 is a side view of a portion of the typewriter frame showing the operating connection, Fig. 5 is a vertical longitudinal section of the registering device, Fig. 6 is a partial side view of the same, Fig. 7 is a similar view from the opposite side, Fig. 8 is a transverse vertical section of the registering device on the line of the tens wheel operating pawl, Fig. 9 is a similar view on the line of one of the index wheels, showing the mechanism for setting the wheels, Fig. 10 is a vertical section of the tens index wheel, Fig. 11 is a side view of the pawl arm, Fig. 12 is an end view of the registering device, and Fig. 13 is a perspective view of the disk.

The embodiment of the invention is shown in the drawings attached to a typewriter frame 1, by means of a clamp consisting of two substantially L-shaped sections 2 and 3, one of which 2 is connected to a bracket 4 on which is supported the casing 5 of the improvement. The sections are arranged with one side 6 engaging the upper and lower edges of the base of the frame, and with the other side 6ª extending vertically transversely of the base, the said sides being in alinement. The side 6ª of the section 3 is provided with a longitudinally extending threaded rod 7, which passes through a lateral lug 8 on the section 2, and is engaged by a wing nut 9, to clamp the sections on the base.

The registering mechanism is held in the casing 5 before mentioned, and consists of a shaft 10, journaled in the casing and provided at one end outside of the casing with a knurled knob 11, for convenience in rotating the shaft within the casing, the shaft having arranged thereon, a plurality of collars 12, 12ª, 13, 14, 15, 16, 17, and 18.

A pawl arm 19 (Fig. 12) is held on the collar 12, and a pawl 20 is pivoted on the arm at 21, and the pawl engages a ratchet wheel 22 on the same collar, the said collar being eccentric to the shaft. The pawl is provided with a tail or handle 23, for a purpose to be presently described.

The first index ring 24 is rigidly connected with the ratchet wheel, by means of dowel pins 25, the ring being arranged on the collars 13 and 14, and consisting of a cylindrical case, having a central partition 26, which divides the ring into two compartments 27 and 28, the former being closed, and the latter open, Fig. 5.

A gear wheel 29 is arranged on the shaft 10 in the compartment 27, and the inner face of the periphery of the compartment is provided with series of internal gear teeth, forming a mutilated internal gear 30. The collar 13 is also eccentric to the shaft, so that the gear wheel meshes with the internal gear at one point only.

In the compartment 28 a disk 31 is arranged rigidly on the collar 15, (Fig. 13) the said disk having on the opposite face from the partition 26, a marginal lateral flange 32, which does not extend entirely around the disk, and the ends 33 and 33ª of the flange are bent inwardly the former being separated from the disk, and resilient as shown in Fig 13.

The disk 31 is arranged rigidly on the collar 15, and a ratchet wheel 34 is arranged on the same collar, fitting against the face of the disk, as shown in Fig. 5 and held thereto by dowel pins 31ª. A spring 35 is secured by one end to the inner surface of case 24, and the free end of the spring is provided with a lateral lug 36, which rides on the flange until the end 33 of the flange is reached, when the end moves inwardly and acts as a pawl for engaging the ratchet wheel (Fig. 8). The second index ring 37 is arranged on the collars 16 and 17, the said ring consisting of a closed cylindrical case, and the collars are spaced apart, to permit a gear wheel 38 to be arranged on the shaft within the ring. The ratchet wheel 34 is secured rigidly to the index ring by means of dowel pins 39, and the gear wheel 38 meshes at one point with a mutilated internal gear 38ª, in the ring.

It will be observed, that the collars 12, 12ª and 13 are integral, the collar 12 being journaled in a recess 40 in the end of the case 5. The collars 14, 15 and 16 are also integral Fig. 10, as are also the collars 17 and 18, the collar 18 being journaled in a recess 41 in the other end of the case 5.

All of the collars are eccentric to the shaft 10, and the collars 12 and 15 are concentric with the collars 13 and 14 respectively, so that the rigidly connected ratchet wheels and index rings may rotate together. The rings are each provided with an annular series of numerals 42—43, which appear successively through an opening 44 in the case 5. The numerals run consecutively from 0 to 9, and each of the ratchet wheels 22 and 34 is provided with ten teeth, so that for every partial rotation or step of a ratchet wheel the index ring to which it is secured will present a numeral at the opening 44. The ratchet wheel 22 is operated or moved one tooth for each word written, by mechanism to be described, and the ratchet wheel 34 is advanced one tooth for every complete rotation of the wheel 22.

The pawl arm 19 extends through an opening 47 in the case 5, and is provided with a transverse opening 48, in which is pivoted a threaded socket 49. A curved lever 50 is secured intermediate its ends to a shaft 51 connected with the frame of the typewriter, and one end of one of the levers has pivoted thereto, a threaded socket 52, and the levers are connected by a bar 52ª.

A rod 53 has its ends threaded into the sockets, and the opposite end of the lever 50, one of which is arranged at each end of the shaft, is provided with a yoke 54, having parallel spaced arms 54ª, extending vertically and adapted to receive therebetween the spacing levers 55 of the typewriter.

The shaft 51 is a sectional shaft, and the inner ends of the section are threaded as shown at 56 in Fig. 3, and engaged by an internally threaded sleeve 57. The sections are oppositely threaded, so that when the sleeve is rotated, the section will be moved toward or from each other, depending upon the direction in which the sleeve is turned.

The shaft 51 is provided at each end with a slightly elastic block 58, which is adapted to bear against the inner face of the sides of the base of the typewriter frame, and when the sleeve 57 is turned in the proper direction, the blocks are forced against the said sides, to clamp the shaft in place.

The bar 52ª which is secured between the levers 51, is held beneath the key levers, and in such position that when a key lever is depressed, the rod is also depressed, tilting the levers 50, and throwing the yokes upward, so that the arms pass on each side of the spacing levers, and are held in that position until the word is written.

The lever 50 is provided with an elongated hub 59, and the ends of the levers are offset laterally from each other, one end extending from one end of the hub, and the other from the opposite end. The shaft 10 of the registering device proper is provided with ratchet teeth 10ª as shown in Fig. 5, adjacent to the gear wheels.

The operation of the device is as follows, the index rings or wheels being set at zero by turning the shaft by means of the knurled knob or head 11, when a word is commenced, the key lever of the first letter engages the bar 52ª, moving the yokes into engagement with the spacing levers, holding them in this position until the word is completed. As soon as the first letter of the word is written the levers 50 are rocked, drawing down the pawl arm 19, and advancing the ratchet wheel 22 one tooth. The index wheel secured thereto is also advanced, and the numeral 1 appears at the opening, showing that one word has been written. The movement of the spacing lever at the end of the word returns the pawl 20 to position. This operation is repeated for each word written, and when ten words have been written the ratchet wheel has made a complete rotation. The pawl or spring 35 has been held out of engagement with the ratchet wheel 34, during this time, by the flange 32, but at the end of the complete rotation it moves over the end 33 of the flange and engages a tooth of the wheel, and advances the ratchet wheel one tooth, and the index wheel one number. As soon as this is done, the end 33ª of the flange engages an offset 60 in the pawl, and lifts the pawl out of engagement with the ratchet wheel. It will be evident that the number of index wheels might be increased indefinitely, the construction of the intermediate wheels being the same as that of the first wheel. When it is desired to set the registering mechanism, the knob 11 is turned. The gear wheels 29 and 38 engage with the mutilated internal gears, and turn the index wheels, until the mutilated portion of the internal gears, register with the engaging part of the gear wheels, thus disengaging the gear wheels from the respective rings. The mutilation is so arranged that the disengagement will occur when the index wheels are brought to zero.

As shown in Figs. 11 and 12, a U-shaped slide 65 is mounted on the pawl arm 19, and is slidable on ribs 66 on the arm, toward and from the tail 23 of the pawl. The slide is used to disengage the pawl, when this is necessary for any purpose, the said slide having a cam 67, which engages beneath the tail and lifts the same to disengage the pawl. When in use it may be locked in position by a set screw 68.

It will be noticed that the shaft 10 adjacent to the gear wheels 29 and 38 is provided with very fine ratchet teeth $10^a$, and a pawl $14^a$ is connected with each wheel and engages the teeth, being pressed thereagainst by a spring $14^b$. The above arrangement constrains the wheels to turn with the shaft when the shaft is turned to set the wheels, but permits the shaft to turn freely in the opposite direction.

I claim—

1. The combination with the typewriter, of a registering device comprising a shaft, a plurality of eccentric collars on the shaft, a pawl arm on one collar, a pawl on the arm, a ratchet wheel having ten teeth and engaged by the pawl, means connected with the spacing bar of the typewriter for operating the pawl arm, a second ratchet wheel journaled on a collar, an index wheel connected with each ratchet wheel, each of said wheels being hollow and having a mutilated series of internal gear teeth, a gear wheel secured to the shaft in each index wheel and meshing with the internal gear teeth, a disk adjacent to the second ratchet wheel, said disk having a lateral flange extending over the periphery of the ratchet wheel, a pawl on the first index wheel for engaging the teeth of the ratchet wheel, and normally held out of engagement therewith by the flange, said flange having an interrupted portion to permit the pawl to engage with the teeth once during each complete rotation of the index wheel and means for turning the shaft.

2. The combination with the typewriter of a registering device, and means for operating the device comprising a sectional shaft, each section having its inner end threaded and its outer end provided with a bearing block of elastic material, the sections being threaded in opposite directions, a threaded sleeve engaging the threaded ends, a lever mounted to rock on the shaft near each end, each lever having at one end a yoke with upwardly extending arms to receive a spacing bar therebetween, a bar connecting the opposite ends of the lever and in position for engagement by the key levers, and a connection between one of the levers and the registering device.

3. The combination with the typewriter, of a registering device, and means for operating the device comprising a sectional shaft, each section having its inner end threaded and its outer end provided with a bearing block of elastic material, the sections being threaded in opposite directions, a threaded sleeve engaging the threaded ends, a lever mounted to rock on the shaft near each end, each lever having at one end means for engagement by a spacing lever to rock the lever, a bar connecting the opposite ends and arranged beneath the key levers for engagement by the said levers when they are depressed, and a connection between one of the levers on the shaft and the registering device.

4. The combination with the typewriter, of a registering device, and means for operating the device comprising a sectional shaft, each section having its inner end threaded and its outer end provided with a bearing block of elastic material, the sections being threaded in opposite directions, a threaded sleeve engaging the threaded ends, a lever mounted to rock on the shaft near each end, each lever having at one end means for engagement by a spacing lever to swing said lever, a connection between the opposite end of one of the levers and the registering device for operating the same, and means connected with the levers for engagement by the key levers to cause the levers of the shaft to engage the spacing levers.

5. The combination with the typewriter, of a registering device, and means for operating the device comprising a sectional shaft, each section having its outer end provided with a bearing block of elastic material, means engaging the adjacent ends of the sections for moving them toward and from each other, a lever mounted to rock on the shaft near each end thereof, and having at one of its ends means for engagement by a spacing lever to rock the said lever, a connection between the opposite end of one of the levers and the registering device for operating the said device, and means in connection with the lever for engagement by the key levers to cause said levers to engage the spacing levers.

6. The combination with the typewriter, of a registering device, and means for operating the device comprising a sectional shaft, each section having its outer end provided with a bearing block of elastic material, the sections being threaded in opposite directions, a threaded sleeve engaging the threaded ends, a lever mounted to rock on the shaft near each end, means engaging the adjacent ends of the sections for moving them toward and from each other, a lever mounted to rock on the shaft near each end thereof, and having at one of its ends means for engagement by a spacing lever to rock the said lever, and a connection between the opposite end of one of the levers and the registering device for operating the said device.

7. The combination with the typewriter, of a registering device, and means for operating the same comprising a sectional shaft, means engaging the inner ends of the sections for moving them toward and from each other to clamp the shaft in the frame of the typewriter, a lever rockably mounted on the shaft, and having at one end means for engagement by a spacing lever to rock the first named lever, and a connection between the opposite end of the lever and the registering device.

8. In a registering device, a shaft, a plurality of index wheels on the shaft, a ratchet wheel connected with one of the said wheels, a pawl arm journaled on the shaft, a pawl on the arm for coöperating with the ratchet wheel, a slide movable on the pawl arm and provided with a cam for engaging the pawl to hold it out of engagement with the ratchet wheel, and means for locking the slide in adjusted position.

9. In a registering device, a shaft, a plurality of index wheels on the shaft, means for operating one of the said wheels, a ratchet wheel connected with the other index wheel, a disk on the shaft having a flange extending above the ratchet wheel, the flange being interrupted at one point, and a pawl on the first-named index wheel normally held out of engagement with the ratchet wheel by the flange, said flange at one end of the interrupted portion being bent inwardly to engage the ratchet wheel to prevent reverse movement thereof.

HUBERT P. HARMON.

Witnesses:
R. F. Harmon,
Harry W. Schnell.